United States Patent [19]
Klein

[11] Patent Number: 4,554,460
[45] Date of Patent: Nov. 19, 1985

[54] PHOTODETECTOR AUTOMATIC ADAPTIVE SENSITIVITY SYSTEM

[75] Inventor: Raymond Klein, Cardiff, Calif.

[73] Assignee: Kollmorgen Technologies Corp., Melville, N.Y.

[21] Appl. No.: 394,868

[22] Filed: Jul. 2, 1982

[51] Int. Cl.$^4$ .......................... H04N 1/04; H04N 5/14
[52] U.S. Cl. .................................... 250/578; 358/284; 364/525; 382/54
[58] Field of Search .............. 250/226, 578, 209; 358/293, 213, 284, 280, 282; 364/525; 382/50, 54

[56] References Cited

U.S. PATENT DOCUMENTS

| | | | |
|---|---|---|---|
| 4,045,816 | 8/1977 | Cave | 382/54 X |
| 4,200,934 | 4/1980 | Hofmann | 364/525 X |
| 4,216,503 | 8/1980 | Wiggins | 358/280 |
| 4,399,464 | 8/1983 | Hix et al. | 358/213 |
| 4,408,231 | 10/1983 | Bushaw et al. | 382/50 X |

OTHER PUBLICATIONS

Golab et al, "FIDAC–Film Input to Digital Automatic Computer"; Pattern Recognition, Pergamon Press 1971, vol. 3, pp. 123-156.

Primary Examiner—Edward P. Westin
Attorney, Agent, or Firm—Poms, Smith, Lande & Rose

[57] ABSTRACT

A photodetector system for generating a series of digital value signals indicative of light intensity and particularly adapted for use in computer enhancement of photography and spectroradiometry. Circuitry is provided for controlling both the integration time of the light as well as the amplification factor applied to the analog signal generated. Logic control circuits are provided to adjust the integration time and amplifier gain to maintain the analog-to-digital converter within its optimal range.

18 Claims, 10 Drawing Figures

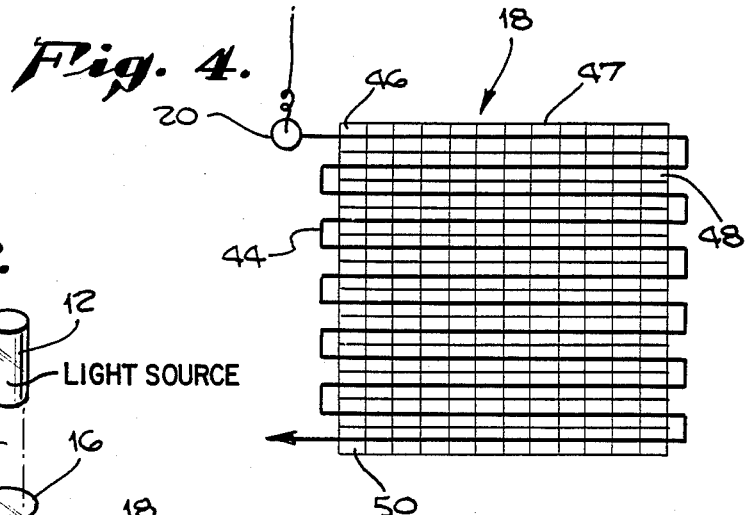
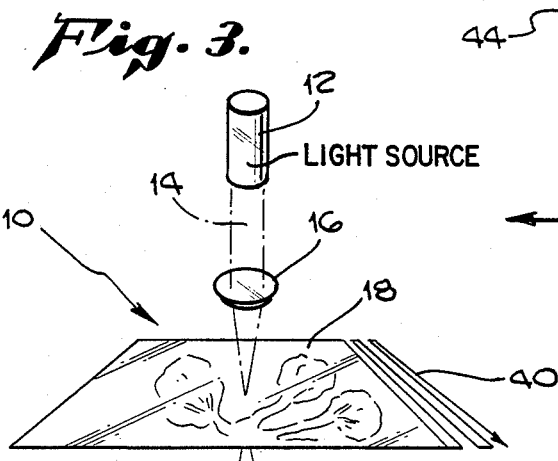
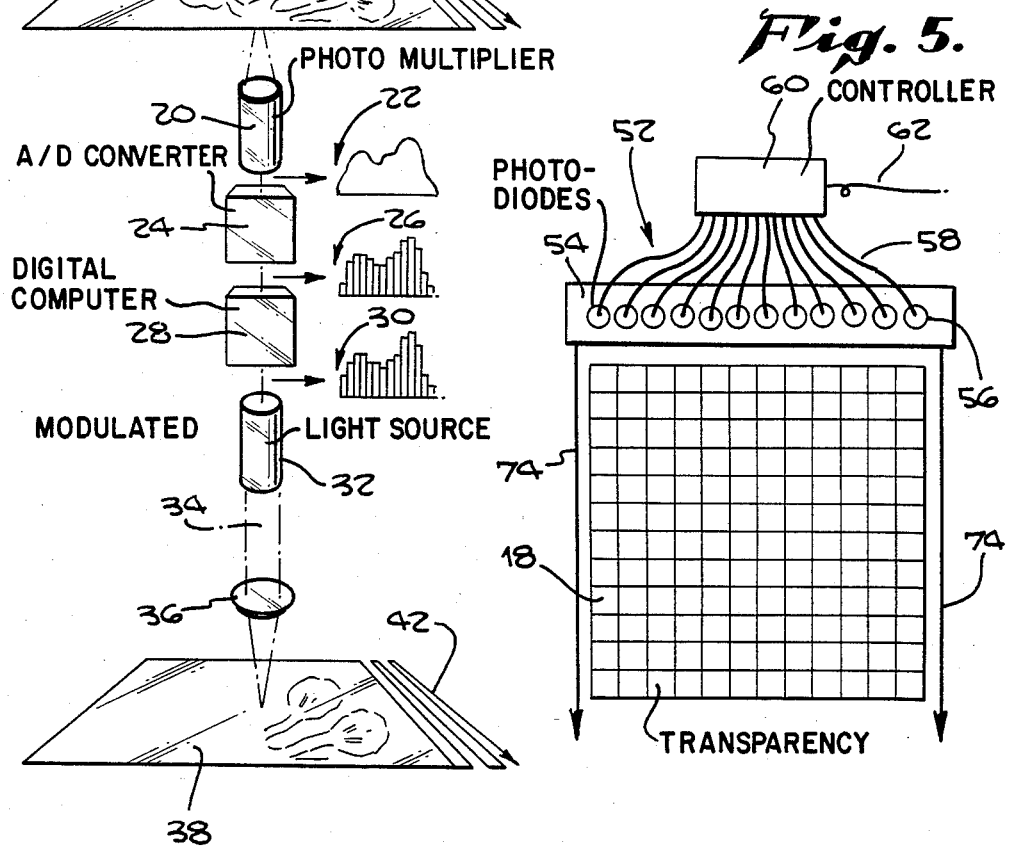

PHOTODETECTOR AUTOMATIC ADAPTIVE SENSITIVITY SYSTEM

BACKGROUND OF THE INVENTION

The present invention relates to photodetector apparatus for generating a signal as a function of light intensity and, more particularly, to circuits generating a digital value reflecting light intensity.

A major area of need for the benefits of the present invention is that of spectroradiometry. As long as there have been artificial light sources, there has been a need to measure and quantify intensity and color, the two basic attributes of light. Color is a spectral quality of light, and the makeup of its wavelengths and corresponding amplitudes comprise the spectral distribution, a typical plot of which is shown in FIG. 1. This spectral distribution is responsible for determining the singular or varied hues and intensities that make up a visual color response.

Strictly speaking, spectroradiometry is the measurement of the spectral distribution of light sources. Interpreting the spectral distribution plot in FIG. 1 points up the psychophysical (visual) importance of spectroradiometry. Here, four narrow lines of very precise wavelength have amplitudes well above the mean signal level, which indicates that there are some very distinct spectral components in the visible range—four distinct colors. It also demonstrates the extremes of intensity that are encountered in such measurements—from virtually 0% to 100% in one sample.

The human eye cannot resolve these spectral lines, requiring instead an instrument to split light into precise spectral components. A conventional photometer with a series of narrowband filters that pass, say, only 5 nm difference in wavelength could do this, but obviously if we don't know the location of the spectral lines, a search of the complete spectrum from 350 to 730 nm with a 5 nm bandwidth would require 80 separate filters—an extremely expensive and time-consuming task. Of the many methods now in use for measuring light intensity and color, spectroradiometry appears to be the best.

In the single detector type spectroradiometer, mechanical deflection is used to sweep the spectrum of the incoming light beam across a single photodetector. Thus, the spectrum intensity data is generated serially at the output of the photodetector. Although very accurate and senstive, mechanically scanned, single-detector spectroradiometers have one major disadvantage—slow speed. Mechanical scanning of a complete spectrum can take anywhere from 15 seconds to 15 minutes, depending on spectral resolution, sensitivity and other instrument parameters. During this time, problems can occur as a result of light source instability or motion. Of course, the mecchanically scanned type also can't be used for measuring a single short flash of light.

A parallel-acquisition device—one that acquires a complete spectrum at the same instant (i.e., a spectrometer)—will eliminate these problems. It may be a Fourier spectrometer, which is of practical interest only in the infrared range, or a spectrograph, which uses a photographic material as the radiation detector. The most useful, however, is the multiple-detector spectroradiometer, which was introduced commercially around 1970.

Construction of a multiple-detector spectroradiometer is much like that of a conventional one in that it uses a wavelength disperser, such as a diffraction grating. However, unlike the monochromator in the conventional type, the multiple-type detector design does not use an exit slit to isolate a single wavelength of light. Instead, the radiation detector itself is placed at the exit focal plane of the disperser so that each element of the multiple-element detector captures a narrow band of wavelengths, acquiring the entire spectrum at once. The primary advantage is that the entire spectrum is acquired in parallel at the same instant, which enables these instruments to measure brief flashes of light or light sources that vary with time.

A multiple-detector spectroradiometer, generally indicated as 100, is shown in simplied form in FIG. 2. The wavelength disperser, generally indicated as 102, in the multiple-detector spectroradiometer 100 is usually referred to as a spectrograph or a polychromator. The optical elements are similar to those in a monochromator, except that they must be optically corrected for a much larger image size. In the wavelength disperser 102, the incoming radiation 104 passes through the entrance slit 106, is collimated by lens 108 and falls on the diffraction grating 110. The diffracted spectrum 112 is focused on the multiple-element photodetector 114 so that each end of the spectrum is aligned with each end of the photodetector 114. The output appears on line 116. Individual elements of the detector 114, as many as 2000 or more, resolve all intermediate spectral bands. As a practical example, a 256-element detector can cover the visible spectrum from 380 to 740 nm with a spectral resolution of 1.4 nm per element. The multiple-element photodetector 114 can be any radiation detector that is either segmented or has spatial resolution capability.

As will be easily recognized, if the multi-element photodetector 114 is connected to a prior art control system such as that of FIG. 6, to be described hereinafter, the possibility and probability of losing valuable data is very high.

Digital image processing is another rapidly expanding art requiring the benefits of the present invention. By such techniques, a photograph is scanned and the information thereon put into digital form. The digital data is then manipulated in a digital computer to enhance the data according to preselected criteria. The enhanced digital data is then used to regenerate an enhanced photograph. For example, an out-of-focus photograph or one streaked by movement of the camera can be digitally processed to improve its resolution and to restore lost details. In many cases, the cause of the blur can be determined from the blurred image itself.

As with most data based systems, the total system is limited by the original input of data. A digital computer processes information in discrete numerical units. Most images, of course, do not come in such units. An ordinary photograph is an analog representation of a scene. The information is recorded in a continuous gradation of tone across the two-dimensional surface of the film. Processing a photograph by means of a computer therefore requires that the analog image first be converted into a digital one.

There are a number of ways of digitizing an image. One example is shown in FIGS. 3 and 4. The system, generally indicated as 10, is what is referred to as a microdensitometer. In such a system, light source 12 projects a beam of light 14 which passes through lens 16 to create a spot of light which passes through the transparency 18 and thereafter strikes a photomultiplier 20 creating an analog signal such as that indicated as 20 at the output thereof. The output of the photomultiplier 20 is connected as an input to a quantizer (A/D converter) 24 which creates a digital signal such as that indicated as 26 at its output. The output of the quantizer 24 is connected to a digital computer 28 which enhances the data according to preset algorithms and stores it for later use. The computer 28 can then take the enhanced data and produce an enhanced digital signal, indicated as 30, which can be used to drive a modulated light source 32 to create a modulated beam of light 34 which passes through focusing lens 36 to create a modulated spot of light on the surface of a film sheet 38 which can then be developed to create an enhanced version of the original photograph on the transparency 18. Both the transparency 18 and the film sheet 38 are moved in a raster scan pattern as indicated by the arrows 40 and 42, respectively.

Turning to FIG. 4, a plan view of the scanning pattern utilized in the system of FIG. 3 is shown. A single photomultiplier 20 is employed. As the transparency 18 is moved under the photomultiplier 20, a scan pattern over the surface of the transparency 18 is created along the line indicated by the arrow 44. The relative movement of the photomultiplier 20 is along a first row 46 and then back along a second row 48. That same back and forth scanning continues until finally it traverses the last row 50. The analog to digital conversion which occurs in the quantizer 24 creates intensity data associated with each individual segment (pixel) 47 of each individual row of the transparency 18. For example, in the example of FIG. 2, there are 12 rows and each row is divided into twelve segments 47. Thus, there would be 144 individual values of digital data to describe the transparency. The brightness of each pixel is still continuously variable, but as part of the quantizing process, it is converted into a discrete numerical value.

An improvement to such systems is shown in FIG. 5. A commercial version of the system of FIG. 5 is sold by the assignee of the present application. The single photomultiplier is replaced by a solid state linear photodiode array 52 (such as that sold by E.G.&G. Reticon of Sunnyvale, California). In the solid state scanner 52, a bar 54 contains a row of silicon photo-diodes 56 in close adjacent relationship. The outputs 58 of the photodiodes 56 are connected to a controller 60 which can output a complete row of pixel values at the output 62 thereof. If the bar 54 is moved over the transparency 18 (or the transparency 18 moved under the bar 54) in the direction of arrows 74, one row at a time can be quantized. This particular environment is another one in which the invention of this application is intended to be used.

Turning to FIG. 6, a prior art control system for use with optical scanners of the type hereinbefore described is shown in simplified form. As shown therein, light 64 striking the surface of a photograph 66 would strike the photomultiplier 20. The electrical output thereof is fed to an amplifier 68. The output of the amplifier is connected to the quantizer 24. The output of the quantizer 24 is connected to the computer 28. An output 70 from the computer is connected back to the amplifier 68 and can be used to set the gain of the amplifier 68 to one of several discrete levels. In such systems, the gain of the amplifier 68 is set to one of its values according to a preselected algorithm in the computer 28 as a function of the value coming from the quantizer 24. Having chosen the amplification value, the quantized value is output at 72 for further use in any manner desired. As can be realized, such a system is rudimentary at best and does not produce an optimized signal value for later use in enhancement. Moreover, when used with a linear photodiode array -type scanner as described with reference to FIG. 5, the problem is compounded.

Wherefore, it is the object of the present invention to provide a control system for optimizing the digital value being generated by a light scanning system as a function of the potential variables being employed.

SUMMARY

The foregoing objectives have been met in a photodetector digital signal generating system comprising photodetector means for receiving light on an input surface thereof and for generating an analog signal at an output in proportion to the amount of incident light; light control means operably connected to the photodetector means for controlling the amount of time the light incident on the input surface is used for measurement purposes; amplification means operably connected to receive the analog signal at an input thereof for producing an adjustably amplified analog signal at an output thereof; analog to digital conversion means operably connected to receive the amplified analog signal at an input thereof for producing a digital value at an output thereof which reflects the value of the amplified analog signal; and, logic control means operably connected to the light control means, the amplification means, and the analog to digital conversion means for receiving the digital signal and for adjusting the amount of time light received by the input surface is used for measurement purposes and the gain of the amplification means necessary to have the analog-to-digital conversion mean operate within a preselected portion of its range.

DESCRIPTION OF THE DRAWINGS

FIG. 3 is a simplified drawing in perspective of a microdensitometer system.

FIG. 4 is a simplified plan view showing the scan pattern of a microdensitometer system such as that of FIG. 3.

FIG. 5 is a simplified plan view of the scanning pattern of a solid state line scanner.

DESCRIPTION OF AN EXEMPLARY EMBODIMENT

Figure 8:
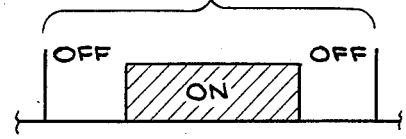
FIG. 8 is an enlarged time line showing the manner in which light integration is controlled in the present invention.
Figure 7:
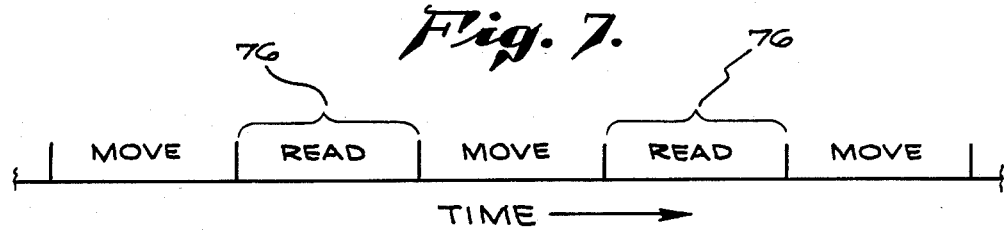
FIG. 7 is a time line showing the movement of the line scanner 52 of FIG. 5.
Figure 9:
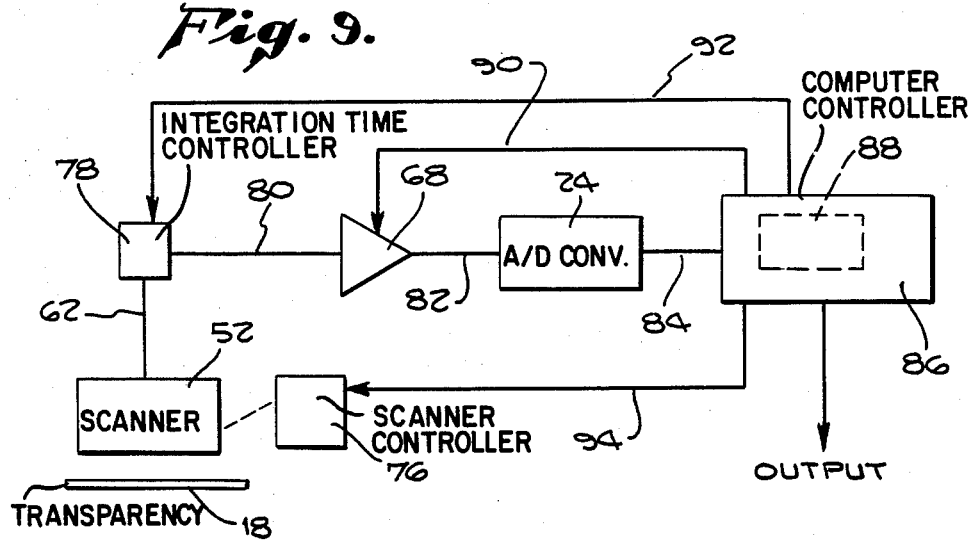
FIG. 9 is a simplified block diagram of a scanning system according to the present invention.

Turning first to FIGS. 5 and 7, a more detailed discussion of one environment wherein the present invention is employed can be had. Assuming the bar 54 is moved by an appropriate mechanism (not shown), the bar 54 will traverse the surface of the transparency 18 in the direction of the arrows 74. The reading of each row occurs in the manner of the time line of FIG. 7. The bar 54 first moves, then reads, then moves, etc. The time of movement of the bar 54 is generally fixed so that each row of pixels has a maximum available time of reading as exemplified by the areas labelled 76 in FIG. 7. Referring to FIG. 8, a single read time interval is shown in expanded scale. The present invention is based on the inclusion of a variable time increment of light integration during the total available read period 76. A block diagram of a system according to the present invention is shown in FIG. 9. The transparency 18 (or photograph from which light is reflected) is placed for scanning by a solid state light scanner 52. The movement of the bar 52 is controlled by the controller 76. The output 62 from the light scanner 52 is connected to an integration time controller 78. The output 80 from the integration time controller 78 is connected as an input to a variable gain amplifier 68. The output 82 from the amplifier 68 is connected to the input of a quantizer 24 whose output 84 is connected as an input to a computing controller 86 containing logic 88. A first output 90 from the computing controller 86 is connected to the amplifier 68 to control the gain thereof. A second output 92 is connected to the integration time controller to control the integration time employed. A third output 94 is connected to the controller 76 to control the movement of the line scanner 52 and to cause a re-read condition when necessary according to the logic to be described hereinafter.

As can be seen, therefore, the basic difference between the present system and the prior art systems is the fact that the system of the present invention controls both the integration time of the light as well as the gain of the amplifier employed in line with the developed signal. Further details of the present invention will now be discussed in depth.

The photosensitive cells contained within the photodiode array 52 are charged before each read cycle. The amount of light impinging upon each cell bleeds off part of the charge. It is the remaining charge which is read and which is used to develop an output signal indicative of the amount of light which struck the cell during that read cycle.

If enough light strikes the cell to bleed off the entire charge, the cell is said to be saturated and the output signal is meaningless. To signal this condition, the integration circuits (68 and 78) are set by the circuitry to output a signal slightly larger than the maximum value that the digitizer 24 can accept when the cell is in the saturation condition. This insures that the maximum digital value of the digitizer is just below saturation, thereby allowing saturation to be reliably sensed by the computer controller 86 without appreciable loss of dynamic range. When the bar 54 of FIG. 5 is scanning, any single photo-diode 56 can be saturated. If any one photo-diode 56 is saturated, the data is meaningless. Therefore, in the control circuit of the present invention, it will be found that the maximum value is found and checked. Preferred operation has been obtained if the peak value can be placed in the upper 20% of the range (i.e., between 80% and 100%), however. The precise manner of accomplishing this according to the preferred embodiment of the present invention will be discussed shortly hereinafter.

Figure 1:
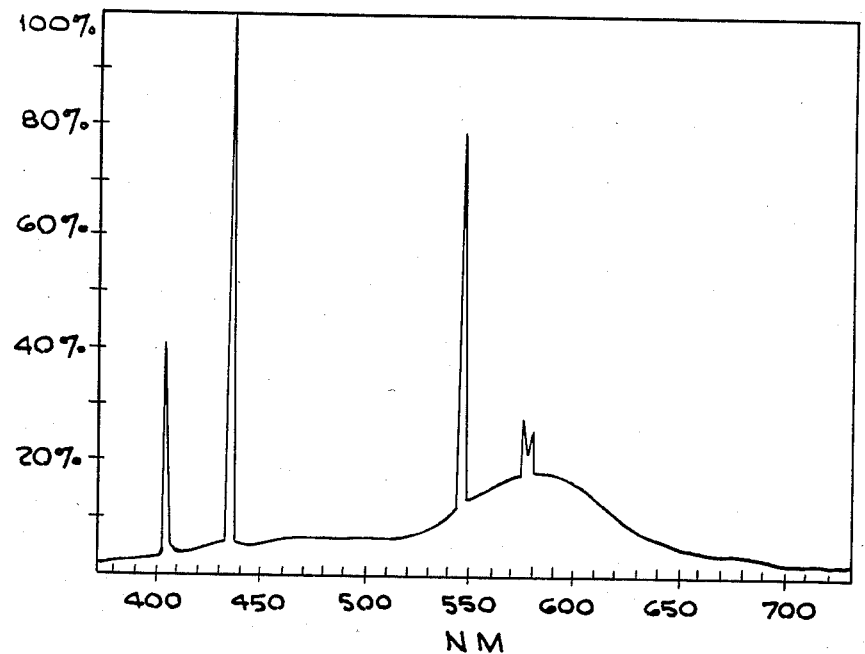
FIG. 1 is a graph of a typical spectral distribution plot.
Figure 2:
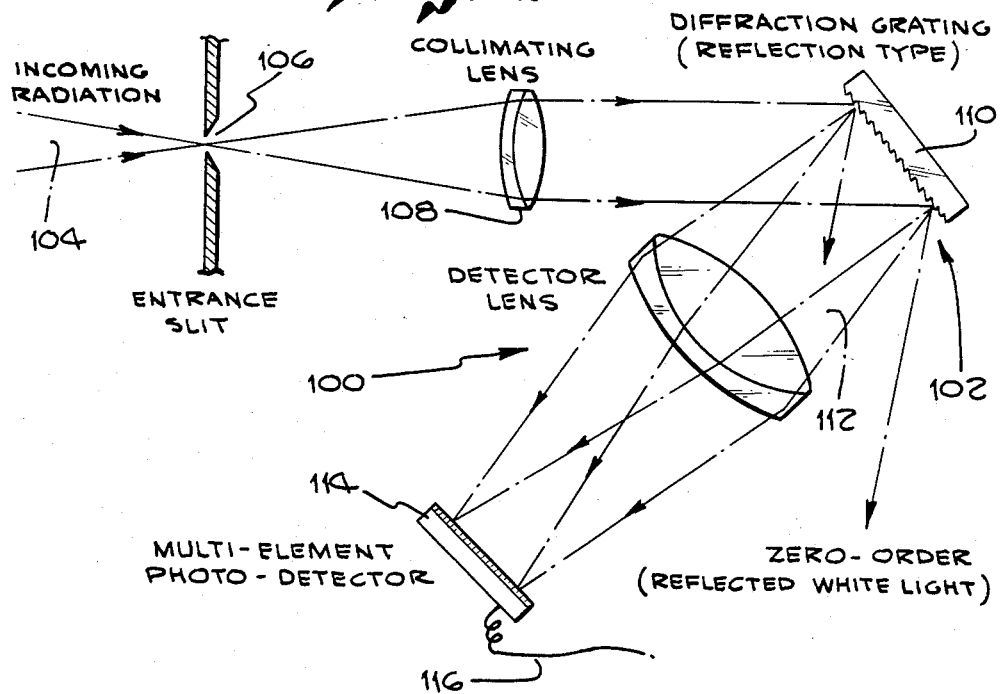
FIG. 2 is a simplified drawing of a multipledetector spectroradiometer.
Figure 6:
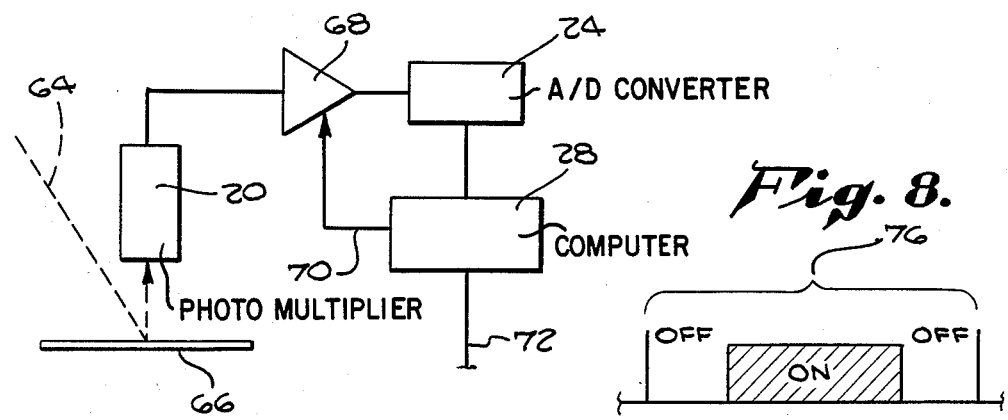
FIG. 6 is a simplified block diagram of a prior art control system for producing quantized digital values corresponding to light sensed.

As will be readily recognized by those skilled in the art, the control system presently being described will work equally well in the spectroradiometry system 100 of FIG. 2 if connected to the multi-element photodetector 114 thereof.

In the tested embodiment of the present invention being described herein, the gain of the amplifier 68 can be set at various discrete values, such as 1X, 2X, or 4X. Likewise, the integration time available (i.e., that labeled "ON" in FIG. 8) can be reduced to a minimum of 0.025 seconds or increased to a maximum of 12 seconds. Those skilled in the art will recognize, of course, that with different equipment, different values will have to be employed.

Figure 10:
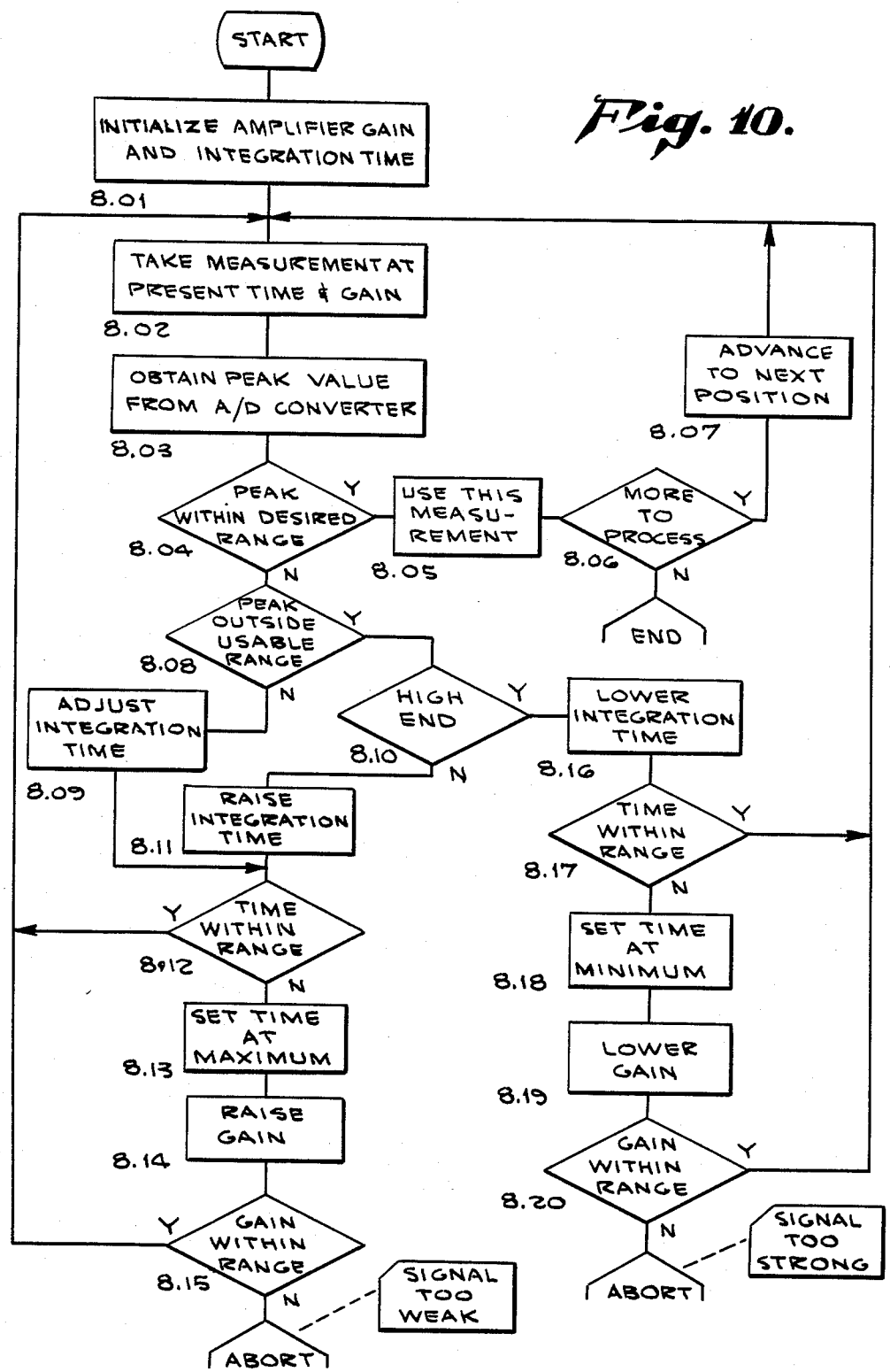
FIG. 10 is a flowchart of the logic employed in a commercial version of the scanning system of FIG. 9.

Referring now to FIG. 10, a flow chart showing the logic employed within logic 88 of a commercially tested computing controller 86 is shown. At the commencement of a new scanning sequence, control begins at action block 8.01 where the amplifier gain and the integration time are initialized to a preselected starting point. Control next moves to action block 8.02 where a measurement is taken at the present time and gain. At action block 8.03, the logic next obtains the peak value from the A/D converter. At decision block 8.04, the logic determines if the peak is within the desired range. As previously discussed, in the preferred embodiment, this desired range is 80%-100%. If the peak value is within the desired range, at action block 8.05, the logic uses the measurement just obtained. That is, the digital values for the row of pixels previously stored in memory is passed on to the remainder of the system logic for use as desired. (The present invention is concerned only with producing an optimized measurement value for the line of pixels. Subsequent use of these values is beyond the scope of the present invention.) At decision block 8.06, the logic tests to see if there are more rows of pixels to be processed. If there are, control is transferred to action block 8.07 which causes the scanner bar 52 to be advanced to the next position by the controller 76. Control is then transferred to action block 8.02 to take the next measurement.

If the test at decision block 8.04 found that the peak was not within the desired range, at decision block 8.08 the logic next checks to see if the peak was outside of the usable range. That is, decision block 8.08 checks to see if the peak value is greater than 20% of the saturation value and less than the lower limit of the desired range. If it is not within that range, it is outside of the "usable range". (The "usable range" is defined as the range of values within which a linear interpolation can be made to derive the integration time required to put the measurement in the desired range). If the peak is within the usable range, control is transferred to action block 8.09 where the integration time is calculated to make the peak value of the next measurement fall within the preferred range. In the preferred embodiment, the adjustment comprises multiplying the present integration time by 0.9 times the ratio of the peak (unsaturated) value of the A/D converter divided by the actual peak measured. Control is then passed to decision block 8.12

If the measured peak was found to be outside of the usable range at decision block 8.08, control of the logic transfers to decision block 8.10 where the peak is checked as to whether it is on the high end or the low end. The high end, of course, means saturation. If the peak is on the low end, control is transferred to action block 8.11 where the integration time is increased. In the preferred embodiment, at this point the integration time is doubled. Control is then transferred to decision block 8.12. Whether control was from action block 8.09 or action block 8.11, the logic checks to see if the integration time now established is within range. Once again, the maximum time in the environment of the tested embodiment being described is 12 seconds. If the integration time is 12 seconds or less, transfer is made to action block 8.02 to retake the measurement at the new values established. It should be noted that each time re-entry is made to action block 8.02, a signal as necessary according to the equipment is sent by the logic on line 94 from the computer 86 to the controller 76 of FIG. 9.

If at decision block 8.12 the logic finds that the time is not within the range (i.e., it is too high), the integration time is set at the maximum value (i.e., 12 seconds) at action block 8.13 and then the gain is increased at action block 8.14. In the preferred embodiment, this comprises doubling the presently used gain. Thereafter, at decision block 8.15, the logic checks to see if the gain is within range. Since 4X is the maximum gain in the tested embodiment, if the value calculated by action block 8.14 is 8X, the gain is no longer within the range and the normal processing is aborted accompanied by a "signal too weak" designation. If the newly calculated gain is within range, transfer of control once again goes to action block 8.02 to retake the measurement.

A similar sequence of events takes place if, at decision block 8.10, the logic finds that the peak is above the high end (i.e., saturated). Control is then given to action block 8.16 where the integration time is decreased. In the preferred embodiment, this comprises dividing the integration time in half. At decision block 8.17, the logic checks to see if the newly calculated time is within range (i.e., 0.02 seconds or greater). If it is, control is transferred to action block 8.02 for a remeasurement. If not, the time is set at the minimum value at action block 8.18 and, thereafter, at action block 8.19 the gain is decreased. In the preferred embodiment, this comprises dividing the gain in half. At action block 8.20, the logic checks to see if the newly calculated gain is within range. Since the minimum acceptable gain is 1X, a calculation of 0.5X indicates a gain not within range and the sequence is aborted accompanied by a "signal too strong" designator. If the gain is within range, as in the previous case, control transfers to action block 8.02 for a remeasurement.

Wherefore, having thus described my invention, I claim:

1. A system for generating a digital signal reflecting the intensity of light from a source comprising:
   (a) photodetector means for receiving the light on an input surface thereof and for generating an analog signal at an output in proportion to the amount of incident light;
   (b) light control means operably connected to said photodetector means for controlling the amount of time the light incident on said input surface is used for measurement purposes;
   (c) amplification means operably connected to receive said analog signal at an input thereof for producing an adjustably amplified analog signal at an output thereof;
   (d) analog to digital conversion means operably connected to receive said amplified analog signal at an input thereof for producing a digital value at an output thereof which reflects the value of said amplified analog signal; and
   (e) logic control means operably connected to said light control means, said amplification means, and said analog to digital conversion means for receiving said digital signal, and for adjusting said amount of time light incident on said input surface is used for measurement purposes and for adjusting the gain of said amplification means necessary to have said analog to digital conversion means operate within a preselected portion of its range.

2. The system of claim 1 wherein:
   (a) said photodetector means includes a plurality of cells generating a portion of said analog signal as a function of the intensity of a portion of the light beam whereby said digital signal comprises a plurality of digital values reflecting the intensity of respective spectral portions of the light beam; and,
   (b) said logic control means selects and uses the highest of said digital values as its basis for adjusting said amount of time and said gain.

3. The system of claim 1 or claim 2 wherein:
   said logic control means produces a signal at an output thereof for operable connection to equipment as necessary indicating that the analog to digital conversion means was outside said preselected range and that a reread is to take place.

4. The system of claim 2 wherein said logic control means includes logic to accomplish the steps of:
   (a) initializing the integration time and amplifier gain;
   (b) taking a measurement at the integration time and amplifier gain as set;
   (c) finding the peak value received from the analog to digital converter;
   (d) checking to see if the peak value is within the desired range and going to step (t) if it is;
   (e) checking to see if the peak value is outside of the usable range and going to step (l) if it is;
   (f) adjusting the integration time;
   (g) checking to see if the new integration time is within range and going to step (b) if it is;
   (h) setting the integration time to its maximum value;
   (i) raising the amplifier gain;
   (j) checking to see if the new amplifier gain is within range and going to step (b) if it is;
   (k) indicating the signal is too weak and terminating the measurement;
   (l) checking to see if the peak is over the high end and going to step (n) if it is;
   (m) raising the integration time and going to step (g);
   (n) lowering the integration time;
   (o) checking to see if the new integration time is within range and going to step (b) if it is;
   (p) setting the integration time to its minimum value;
   (q) lowering the amplifier gain;
   (r) checking to see if the new amplifier gain is within range and going to step (b) if it is;
   (s) indicating the signal is too strong and terminating the measurement;
   (t) using the value for output.

5. The system of claim 4 wherein said system is connected to apparatus for taking a sequence of measurements and wherein said logic includes logic to accomplish the following steps after step (t):
   (u) checking to see if there are additional measurements to take and, if not, terminating the measurements;
   (v) outputting a signal to the apparatus signalling the next sequential measurement is to be made and going to step (b).

6. The system of claim 4 wherein:
   said step (f) thereof comprises setting the integration time to the present integration time times 0.9 times the maximum analog to digital value below saturation divided by the peak analog to digital value just measured.

7. The system of claim 4 wherein:
said step (i) comprises doubling the gain.

8. The system of claim 4 wherein:
said step (q) comprises halving the gain.

9. A system for generating a digital value reflecting the intensity of light from a source comprising:
(a) photodetector means having an input surface impinged upon by the light for generating an analog signal at an output thereof as a function of the intensity of the light;
(b) integration means having an input connected to said output of said photodetector means for integrating the value of said analog signal and for presenting an integrated analog signal at an output thereof; said integration means including a control input for receiving a control signal to stop and start said integrating;
(c) variable gain amplifier means having an input connected to said output of said integration means for producing an amplified integrated analog signal at an output thereof, said amplifier means including a control input for receiving a control signal to adjust the gain of said amplifier means;
(d) analog to digital conversion means having an input connected to said output of said amplifier means for generating a digital value at an output thereof which is a function of said amplified integrated analog signal; and,
(e) control and logic means having an input connected to said output of said analog to digital conversion means, a first output connected to said control input of said integration means, a second output connected to said control input of said variable gain amplifier means, and a third output for the digital value being generated, for adjusting the time of integration of said integrating means and the gain of said amplifier means as a function of said digital value to operate said analog to digital conversion means with the peak value of said amplified integrated analog signal in a preselected portion of the operating range of the said analog to digital conversion means and for outputting said digital value at said third output when said conversion means is operating in said preselected portion of its range.

10. The system of claim 9 wherein:
(a) said photodetector means includes a plurality of cells generating a portion of said analog signal as a function of the intensity of a portion of the light beam whereby said digital value comprises a plurality of digital values reflecting the intensity of respective spectral portions of the light beam; and,
(b) said control and logic means selects and uses the highest of said plurality of digital values as its basis for adjusting the integration time of said integration means and the gain of said amplifier means.

11. The system of claim 9 or claim 10 wherein:
said control and logic means produces a signal at a fourth output thereof adapted for connection to peripheral equipment using the digital value generated and indicating that the analog to digital conversion means was outside of said preselected portion of its range and that a reread is to take place.

12. The system of claim 9 wherein said logic control means includes logic to accomplish the steps of:

(a) initializing the integration time and amplifier gain;
(b) taking a measurement at the integration time and amplifier gain as set;
(c) finding the peak value received from the analog to digital converter;
(d) checking to see if the peak value is within the desired range and going to step (t) if it is;
(e) checking to see if the peak value is outside of the usable range and going to step (l) if it is;
(f) adjusting the integration time;
(g) checking to see if the new integration time is within range and going to step (b) if it is;
(h) setting the integration time to its maximum value;
(i) raising the amplifier gain;
(j) checking to see if the new amplifier gain is within range and going to step (b) if it is;
(k) indicating the signal is too weak and terminating the measurement;
(l) checking to see if the peak is over the high end and going to step (n) if it is;
(m) raising the integration time and going to step (g);
(n) lowering the integration time;
(o) checking to see if the new integration time is within range and going to step (b) if it is;
(p) setting the integration time to its minimum value;
(q) lowering the amplifier gain;
(r) checking to see if the new amplifier gain is within range and going to step (b) if it is;
(s) indicating the signal is too strong and terminating the measurement;
(t) using the value for output.

13. The system of claim 12 wherein said system is connected to apparatus for taking a sequence of measurements and wherein said logic includes logic to accomplish the following steps after step (t):
(u) checking to see if there are additional measurements to take and, if not, terminating the measurements;
(v) outputting a signal to the apparatus signalling the next sequential measurement is to be made and going to step (b).

14. The system of claim 12 wherein:
said step (f) thereof comprises setting the integration time to the present integration time times 0.9 times the maximum analog to digital value below saturation divided by the peak analog to digital value just measured.

15. The system of claiam 4 wherein:
said step (i) comprises doubling the gain.

16. The system of claim 4 wherein:
said step (q) comprises halving the gain.

17. A system for generating a digital signal reflecting the intensity of light from a source comprising:
(a) photodetector means for receiving the light on an input surface thereof and for generating an analog signal at an output in proportion to the amount of incident light;
(b) light control means operably connected to said photodetector means for controlling the amount of time the light incident on said input surface is used for measurement purposes;
(c) amplification means operably connected to receive said analog signal at an input thereof for producing an adjustably amplified analog signal at an output thereof;
(d) analog to digital conversion means operably connected to receive said amplified analog signal at an input thereof for producing a digital value at an output thereof which reflects the value of said amplified analog signal;
(e) logic control means operably connected to said light control means and said analog to digital conversion means for receiving said digital signal and for adjusting said amount of time light incident on said input surface is used for measurement purposes toward the amount of time necessary to have said analog to digital conversion means operate within a preselected portion of its range; and
(f) means for adjusting the gain of said amplification means if the analog to digital conversion means is not operating within said preselected range following the adjusting of said time as specified in paragraph (e) hereof.

18. The system of claim 17 wherein:
(a) said photodetector means includes a plurality of cells each generating a portion of said analog signal as a function of the intensity of a portion of the spectrum of the light beam whereby said digital signal comprises a plurality of digital values reflecting the intensity of respective spectral portions of the light beam; and,
(b) said logic control means selects and uses the highest of said digital values as its basis for adjusting said amount of time.

* * * * *